United States Patent
Auschra et al.

Patent Number: 5,712,359
Date of Patent: Jan. 27, 1998

[54] CO-OLIGOMERS AND COPOLYMERS HAVING DISPERSANT ACTIVITY

[75] Inventors: Clemens Auschra, Mainz; Horst Pennewiss, Darmstadt; Susanne Graner, Buettelborn, all of Germany

[73] Assignee: Roehm GmbH Chemische Fabrik, Kirschenallee, Germany

[21] Appl. No.: 813,292

[22] Filed: Mar. 10, 1997

Related U.S. Application Data

[63] Continuation of Ser. No. 498,292, Jul. 3, 1995, abandoned.

[30] Foreign Application Priority Data

Jul. 4, 1994 [DE] Germany .......................... 44 23 358.2

[51] Int. Cl.⁶ .......................... C08F 220/10; C08F 210/00
[52] U.S. Cl. .......................... 526/329
[58] Field of Search .......................... 526/260, 329

[56] References Cited

U.S. PATENT DOCUMENTS

| | | | |
|---|---|---|---|
| 3,337,516 | 8/1967 | Stuart et al. | 260/86.1 |
| 3,651,029 | 3/1972 | Fujimoto et al. | 526/260 |
| 5,188,770 | 2/1993 | Pennewiss | 252/56 S |

FOREIGN PATENT DOCUMENTS

| | | |
|---|---|---|
| 0 418 610 | 3/1991 | European Pat. Off. |
| 17 45 359 | 9/1971 | Germany . |
| 1 520 696 | 6/1972 | Germany . |
| 28 05 826 | 8/1979 | Germany . |
| 29 05 954 | 8/1980 | Germany . |
| 32 07 291 | 9/1983 | Germany . |
| 39 30 142 | 3/1991 | Germany . |
| 3930142 | 3/1991 | Germany . |
| 54-041729 | 4/1979 | Japan . |

*Primary Examiner*—Joseph L. Schofer
*Assistant Examiner*—Wu C. Cheng
*Attorney, Agent, or Firm*—Oblon, Spivak, McClelland, Maier & Neustadt, P.C.

[57] ABSTRACT

Co-oligomers and copolymers having dispersant activity and usable as emulsifiers are based on esters of (meth) acrylic acid; where the co-oligomers and copolymers are comprised of the following components:

(A) 60–95 wt. % of at least one (meth)acrylic acid ester of formula I $$CH_2=\underset{R}{\overset{|}{C}}-\underset{}{\overset{O}{\overset{\|}{C}}}-OR_1 \quad (I)$$

where

R represents hydrogen or methyl, and $R_1$ represents a (possibly branched) alkyl group or a cycloalkyl group with 4–32 carbon atoms in the alkyl group; and (B) 5–40 wt. % of a (meth)acrylic acid ester of formula II $$CH_2=\underset{R'}{\overset{|}{C}}-\underset{}{\overset{O}{\overset{\|}{C}}}-O-(CH_2-CH_2O)_n-(\underset{CH_3}{\overset{|}{CH}}-CH_2O)_m-R_5 \quad (II)$$

where

R' represents hydrogen or methyl, $R_2$ represents an alkyl or aryl group with 1–50 carbon atoms, where $R_2$ itself may be substituted with nitrogen or sulfur, n may be a number from 5 to 100, and m may be a number from 0 to 100;

and, in the amount of 0–90 mol % of the monomer(s) of formula II, a hydroxyalkyl ester of (meth)acrylic acid, of formula III:

$$CH_2=\underset{R''}{\overset{|}{C}}-\underset{}{\overset{O}{\overset{\|}{C}}}OR_3 \quad (III)$$

where

R" represents hydrogen or methyl, and $R_3$ represents an alkyl group substituted with at least one hydroxyl group and having 2–30 carbon atoms;

with the proviso that (A) and (B) together make 100 wt. %; and (C) an additional 0–75 wt. %, based on the weight of (A)+(B), of at least one 1-alkene having 4–42 carbon atoms.

5 Claims, 2 Drawing Sheets

CO-OLIGOMERS AND COPOLYMERS HAVING DISPERSANT ACTIVITY

This application is a Continuation of application Ser. No. 08/498,292, filed on Jul. 3, 1995, now abandoned.

BACKGROUND OF THE INVENTION

1. Field of the Invention

The invention relates to co-oligomers and copolymers having dispersant activity, which are based on esters of (meth)acrylic acid with alkoxylated alcohols having a specified content of ethyleneoxy and propyleneoxy units. The subject compounds are used as emulsifiers, particularly for water-in-oil (W/O) emulsions, and are particularly suitable for use in the field of lubricants (as so-called "ashless dispersants").

2. Discussion of the Background

Performance requirements for lubricating oils have become more stringent in recent decades; among the reasons for this have been modern developments in the engine sector. Particular importance attaches to thermal stability, the impeding of deposition processes, and wear protection at elevated temperatures (see 1990, Ullmann's Encyclopedia of Industrial Chemistry, 5th Ed., Vol. A 15, pub. VCH, pp. 448–465). The characteristics of lubricating oils can be influenced in a rational way by oil additives. For decades, the principal additives were metal salts, which confer the necessary detergency on lubricating oils. Then, so-called "ashless" ("ash-free") detergents were introduced, generally consisting of polymer compounds with polar functional groups; these additives ordinarily also improve the viscosity index, and may lower the set point (see Brient, J., Denis, J., and Parce, G., 1989, "Rheological properties of lubricants", pub. Editions Technip, pp. 179–181).

In particular, poly(meth)acrylic acid esters and polyolefins, functionalized with polar nitrogen-containing or oxygen-containing groups, have come to be used. Polyalkyl methacrylates and so-called "mixed polymers" comprised of polyalkyl methacrylates and olefin copolymers (OCPs), having nitrogen-containing functional groups, are known from Ger. Pats. 1,520,696, 1,745,359, 2,805,826, 2,905,954, 3,207,291, and 3,207,292. There are indications that these additives have a deleterious effect on anti-wear additives and also have a degrading action on elastomeric seals; these effects are attributable to the functional groups. The polyalkyl methacrylates and "mixed polymers" of Ger. OS 39 30 142 represent an improvement over the described dispersant additives, because they contain only groups with the elements carbon, hydrogen, and oxygen, and are free of nitrogen-containing functional groups. However, it has been found that polyalkyl methacrylates and "mixed polymers" with the alkoxylated groups set forth in Ger. OS 39 30 142 become increasingly insoluble in mineral oil formulations as the degree of alkoxylation increases, at high degrees of alkoxylation (>20). On the other hand, on the low-polymeric and oligomeric side, the class of polyisobutenyl succinimides is well-known as providing ashless dispersants. However, these compounds have the disadvantages of the above-described nitrogen-containing polyalkyl methacrylates and OCPs, and in addition have a substantial thickening effect on the oil formulation at low temperatures. This thickening necessitates the use of relatively low viscosity oil base components which may be undesirable for other reasons.

SUMMARY OF THE INVENTION

As seen from the preceding, there is a continuing need for ashless dispersants which do not unduly thicken the oil base at low temperatures, have good solubility in a variety of lubricant formulations, and exhibit minimal or no interference with anti-wear additives (or themselves have anti-wear characteristics). Also desired are emulsifiers which are suitable for stabilizing W/O emulsions, and which have good characteristics for use in engines (e.g. do not degrade seals or attack metal parts) (see "Ullmann's Encyclopedia", loc. cit., Vol. A 15, p. 453).

It has been found, in connection with the present invention, that the co-oligomers and copolymers of the invention solve the described problem very well.

DETAILED DESCRIPTION OF THE PREFERRED EMBODIMENTS

Figure 1:
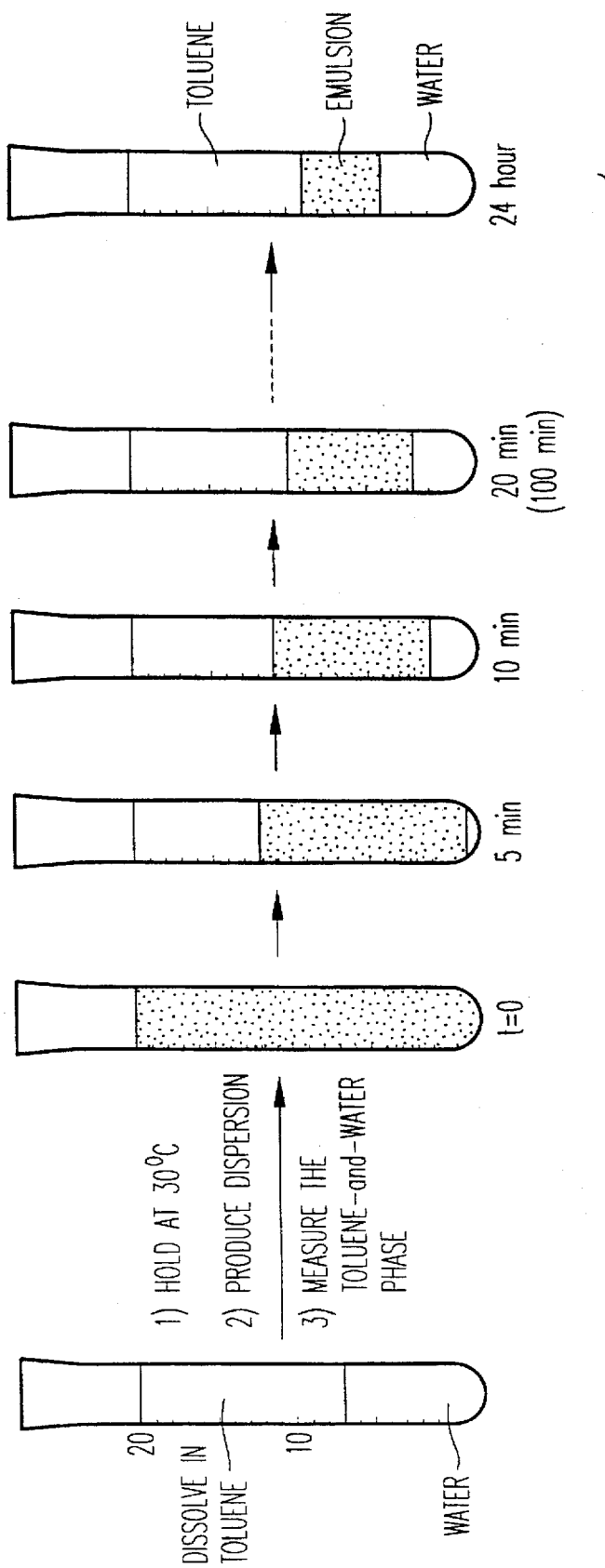
FIG. 1 shows a representation of the toluene/water dispersion test used to quantitate the emulsifying action of the dispersants of the present invention.

The invention relates to co-oligomers and copolymers, having dispersant activity, for use as emulsifiers, being based on (meth)acrylic acid esters, and in particular having the following components:

(A) 60–95 wt. % preferably 62–80 wt. %, of at least one (meth)acrylic acid ester of formula I

where

R is hydrogen or methyl, and $R_1$ is a straight chain or branched alkyl group or a cycloalkyl group with 4–32, preferably 6–30, particularly preferably 8–26 carbon atoms in the alkyl group; and (B) 5–40 wt. %, preferably 10–30 wt. %, of a (meth) acrylic acid ester of formula II

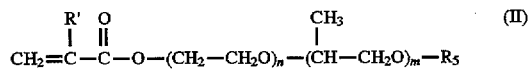

where

R' is hydrogen or methyl, $R_2$ is an alkyl or aryl group with 1–50 carbon atoms, where $R_2$ itself may be substituted with nitrogen or sulfur, n is a number from 5 to 100, preferably 10–90, and m is a number from 0 to 100, preferably 10–90;

and, in the amount of 0–90 mol %, optionally 1–90 mol %, of the monomer(s) of formula II, a hydroxyalkyl ester of (meth)acrylic acid, of formula III:

where

R" is hydrogen or methyl, and $R_3$ is an alkyl group substituted with at least one hydroxyl group and having 2–30, preferably 2–12 carbon atoms; with the proviso that (A) and (B) together make 100 wt. %; and (C) an additional 0–75 wt. % preferably 1–30 wt. % based on the weight of (A)+(B), of at least one 1-alkene having 4–42, preferably 4–20 carbon atoms.

Of particular interest are co-oligomers and copolymers where the group $R_2$ in formula II is substituted with at least one group —$NR_4R_5$, where $R_4$ and $R_5$, independently, represent an alkyl group with 1-20 carbon atoms, or together $R_4$ and $R_5$ form a 5- or 6-membered ring which includes the nitrogen atom and possibly an additional oxygen or nitrogen atom, which ring may be substituted with an alkyl group having 1-6 carbon atoms.

One might mention, e.g., dimethylamino, diethylamino, methylisopropylamino, piperidino, pyrrolidino, and morpholino, among other possibilities.

The Co-oligomers and Copolymers

The weight average molecular weights Mw of the co-oligomers and copolymers are in the range 1,000-300,000 Dalton, particularly in the range 3,000-30,000 Dalton (as determined by gel permeation chromatography, see Mark, H. F., et al., 1987, "Encyclopedia of polymer science and technology", Vol. 10, pub. J. Wiley, pp. 1-19; and Dawkins, J. V., 1989, "Comprehensive polymer science", Vol. 1, pub. Pergamon Press, p. 231).

Candidates for use as monomers of formula I are particularly (meth)acrylic acid esters of mixtures of higher alcohols having 9-20 carbon atoms, particularly 10-18 carbon atoms, with degrees of branching in the range 25%, to more than 80%, e.g., mixtures such as are produced in large-scale manufacturing processes, such as the oxo process.

One might mention, e.g., esters of the DOBANOL® alcohols (products of Shell), the ALFOL® alcohols (products of Condea), the LOROL® alcohols, the tallow fat alcohols, etc. Of particular interest are, e.g., esters of: mixtures of isomeric isodecyl alcohols, mixtures of isomeric iso-undecyl alcohols, and mixtures of alcohols with an average of 13.2-13.8 carbon atoms, with $C_{12}$—$C_{15}$-alcohols predominating (DOBANOL® 25L). One may also successfully use esters of cyclic alkanols having, e.g., 5-8 carbon atoms in the ring, which cyclic alkanols may be, e.g., cyclopentanol, cyclohexanol, benzyl alcohol, or alkyl-substituted cyclohexanols such as, e.g., 4-tert-butylcyclohexanol.

Candidates as compounds of formula II include, e.g., the (meth)acrylic acid esters of alkoxylated aliphatic alcohols such as, e.g., alkoxylated butanol, other alkoxylated alcohols, based on:

methanol, ethanol, propanol, pentanol, (and isomers), hexanol (and isomers), cyclohexanol, methylcyclohexanol, 2-ethylhexanol, higher aliphatic monohydric alcohols, such as: isodecanol, isoundecanol, isotridecanol, and fatty alcohols produced from natural raw materials, etc.

Other candidates for use as compounds of formula II are alkoxylated phenols, e.g. based on phenol or alkyl-substituted phenols (e.g. tert-butylphenol or 2,6-dimethylphenol); isomeric mixtures of technical alkylphenols, e.g. octylphenol, nonylphenol, or dinonylphenol; naphthol, and alkyl-substituted naphthols; and products of addition of ethylene oxide and/or propylene oxide to substituted alcohols such as: furfurol, tetrahydrofurfurol, 2-methoxybutanol, 3-methoxybutanol, 2-dimethylaminoethanol, 2-diethylaminoethanol, 1-dimethylamino-2-propanol, 3-dimethylamino-1-propanol, 2-morpholinoethanol, 2-(2-pyridyl)ethanol, N-(2-hydroxyethyl)piperidine, N-(2-hydroxyethyl)pyrrolidine, and N-(2-hydroxyethyl)pyrrolidone.

Also suitable are, e.g., alcohols representing a (statistical) addition product of ethylene oxide and propylene oxide to an alcohol such as, e.g., butanol. A suggested molecular weight of preferred monomers of formula II is in the neighborhood of 2000 Dalton; however, this does not represent a limitation. Depending on the degree of alkoxylation (n+m in formula II) and the size of the group $R_2$, the molecular weight may be as high as about 5000 Dalton. The monomers of formula II may comprise mixtures of methacrylates of a plurality of alkoxylated alcohols described above. Preferably, the alkoxylated alcohols contain ethyleneoxy and propyleneoxy units in a molar ratio of 96:4 to 6:94, more preferably 80-50:20-50.

The monomers of formula III are radically polymerizable 1-alkenes with 4-32 carbon atoms. One might mention specifically the alkenes with 4-16 carbon atoms, e.g. 1-decene, 1-octene, 1-dodecene, 1-tetradecene, and 1-hexadecene; also 1-octadecene and 1-eicosene.

The oligomers having dispersant activity are produced according to the methods and experience of radical polymerization (see Bamford, C. H., 1988, "Encyclopedia of polymer science", Vol. 13, 2nd Ed., p. 708). Preferably, solution polymerization is employed, in a suitable organic solvent L.

The solvent L may be any of the following:

(a) A high boiling inert solvent such as, e.g., decahydronaphthalene (DECALIN®, boiling point>180° C.), dodecylbenzene (b.p.>275° C.), tert-butylbenzene (b.p. 169° C.), or dodecane (b.p. 216° C.), or (b) Advantageously, a solvent or solvents known to have a molecular weight regulating effect in radical polymerization, such as, e.g., 1,2,3,4-tetrahydronaphthalene (tetralin, b.p. 207° C.), cyclooctene (b.p. 144° C.), technical dipentene (a mixture of terpene hydrocarbons, b.p.>170° C.), or a mixture of solvents from among (a) and (b); or (c) Advantageously, instead of a distinct organic solvent L, the product itself, i.e. the oligomer or another different oligomer with a different chemical composition and molecular weight, may be used as a solvent. This obviates removal of the solvent L by distillation; further it enables direct production of mixtures of oligomers having dispersant activity which are complementary in their effects (see Example 7).

Candidates for use as initiators are per se known, particularly organic radical initiators, preferably having a decomposition temperature in the range 90°-130° C. for standard half-life conditions (see Logemann, H., in Houben and Weyl, 1961, "Methoden der Organischen Chemie" 4th Ed. Vol XIV/1 pub Georg Thieme, p. 248; and Brandrup and Immergut, 1989, "Polymer Handbook", 34d Ed., Vol. II-1, pub. J. Wiley); e.g., initiators chosen from the group of organic peroxy compounds, particularly those having tertiary alkyl groups, e.g. 2,3-bis(tert-butylperoxy)butane, tert-butyl perbenzoate, di-tert-butyl peroxide, cumene hydroperoxide, etc.

As a rule, the initiators are employed in amounts of about 0.01-2 wt. % (based on the weight of the monomers). The polymerization temperatures are generally relatively high, e.g. above 120° C. and up to about 160° C. advantageously about 140° C.

A particular method may be the following: A suitable reactor, e.g. a three-necked flask with gas inlet, stirrer, distillation head, and thermometer, preferably under a protective gas such as nitrogen, is used. The solvent L heated to the polymerization temperature, e.g. 140° C. is charged to the reactor, and the mixture of monomers is added continuously over a certain period, e.g. 3 hr. The feed vessel with the monomer mixture is held at 50° C. under stirring. After completion of the feed, the initiator is added portionwise at intervals of, e.g., 30 min, at, e.g., 140° C.. Advantageously the initiator is provided in an organic solvent, e.g. is diluted 1:1 in an aliphatic solvent. Ordinarily, the addition of initiator extends over a number of hours; a suggested period is 8 hr. Approximately ½ hr following the last addition, the mixture is cooled to a temperature at which the solvent L can be conveniently removed, preferably at pressures in the millibar range, e.g. in an oil pump vacuum.

Advantageous Effects

The inventive co-oligomers and copolymers are strong emulsifiers. They are very well-suited for stabilizing W/O emulsions. These properties can be well-demonstrated in a toluene/water (T/W) test which was developed especially as a screening test for emulsification.

These dispersing oligomers and copolymers (referred to as "d-oligomers") are particularly important as "ashless dispersants" for use as additives to lubricating oils. Their remarkable effects also make them candidates for numerous other areas of application, e.g. (to name a few) as dispersants in transmission oil formulations (automatic transmission fluids, ATF); emulsifiers for W/O or O/W emulsions, e.g. for emulsion polymerization; stabilizers for dispersions of inorganic and organic particles in solvents, e.g. in latex paints; additives for adhesives, e.g. for improved wetting of surfaces; surface treating agents, e.g. to hydrophobize polar surfaces or to hydrophilize nonpolar surfaces; compatibilizers for polymer blends; plasticizers, softeners, or impact strength modifiers, for relatively polar plastics; phase transfer catalysts for heterogeneous (W/O) reaction systems; additives to improve biodegradability of water-insoluble oils (by improved O/W dispersion); and dispersant additives in motor fuels.

Having generally described this invention, a further understanding can be obtained by reference to certain specific examples which are provided herein for purposes of illustration only and are not intended to be limiting unless otherwise specified.

EXAMPLES

A. General Production Methods

Materials
  Monomer I-1: Methacrylic acid esters of DOBANOL® 25L (Shell AG). DOBANOL® 25l is a mixture of $C_{11}$–$C_{16}$-alcohols, with carbon number 13.2–13.8 and content of n-alcohols 72–82%.
  Monomer I-2: Methacrylic acid esters of a mixture of isomeric isodecyl alcohols.
  Monomer II-1: Methacrylic acid ester of alkoxylated butanol (a statistical addition product of ethylene oxide and propylene oxide in a ratio of 80:20 by weight, to butanol or ethylene glycol monobutyl ether), molecular weight 2000 Dalton.
  Alkene: 1-Decene.
  Initiator solution IN-1: 2-2-bis-(tert-Butylperoxy) butane, 50 wt. % solution in
aliphatic solvents (the product INTEROX® BU-50-Al of the firm Interox Corp.).
  Solvent L: Tetralin or DECALIN® (mixture of isomers).

Example 1

Production of a Dispersant Oligomer, in Tetralin 93 g Tetralin was charged to a three-necked flask with magnetic stirrer, thermometer, distillation head, and $N_2$ inlet, and was heated to 140° C. under $N_2$. The following mixture was pumped into the hot solvent continuously over a period of 3 hr:
  40.1 g tetralin
  40.1 g monomer II-1
  146.4 g monomer I-1
  13.4 g 1-decene.
The feed vessel with the monomer mixture was heated to 50° C. and stirred. After completion of the feeding, 16 aliquots of 0.25 mL initiator solution IN-1 were added over 7.5 hr (at intervals of 30 min), at 140° C. 30 min after the last addition, the resulting mixture was cooled to 60° C., and the tetralin and decene were distilled off under vacuum (2 mbar) until a bottoms temperature of 163° C. was reached.

Yield: 191 g oligomeric dispersant.

Example 2

Production of a Dispersant Oligomer, in Tetralin 1120 g Tetralin was charged to a three-necked flask with magnetic stirrer, thermometer, distillation head, and $N_2$ inlet, and was heated to 140° C. under $N_2$. The following mixture was pumped into the hot solvent continuously over a period of 3 hr:
  347.8 g monomer II-1
  692.1 g monomer I-2
  640.0 g monomer I-1
  84.0 g oligomer from Example 1
  10.10 g initiator solution IN-1.
The feed vessel with the monomer mixture was heated to 50° C. and stirred. After completion of the feeding, 16 aliquots of 2.07 mL initiator solution IN-1 were added over 7.5 hr (at intervals of 30 min), at 140° C. 30 min after the last addition, the resulting mixture was cooled to 60° C. and the tetralin was distilled off under vacuum (2 mbar) until a bottoms temperature of 163° C. was reached.

Yield: 1747 g oligomeric dispersant.

Example 3

Production of a Dispersant Oligomer, in 1-decene 650 g 1-Decene was charged to a three-necked flask with magnetic stirrer, thermometer, distillation head, and $N_2$ inlet, and was heated to 140° C. under $N_2$. The following mixture was pumped into the hot solvent continuously over a period of 3 hr:
  153.4 g monomer II-1
  496.6 g monomer I-2
  32.5 g oligomer from Example 1
  3.90 g initiator solution IN-1.
The feed vessel with the monomer mixture was heated to 50° C. and stirred. After completion of the feeding, 16 aliquots of 0.80 mL initiator solution IN-1 were added over 7.5 hr (at intervals of 30 min), at 140° C. 30 min after the last addition, the resulting mixture was cooled to 60° C., and the 1-decene was distilled off under vacuum (2 mbar) until a bottoms temperature of 163° C. was reached.

Yield: 905 g oligomeric dispersant.

Example 4

Production of a Dispersant Oligomer, in 1-decene 175 g 1-Decene was charged to a three-necked flask with magnetic stirrer, thermometer, distillation head, and $N_2$ inlet, and was heated to 140° C. under $N_2$. The following mixture was pumped into the hot solvent continuously over a period of 2 hr:

41.3 g monomer II-1
133.7 g monomer I-2
1.05 g initiator solution IN-1.

The feed vessel with the monomer mixture was heated to 50° C. and stirred. After completion of the feeding, 16 aliquots of 0.22 mL initiator solution IN-1 were added over 7.5 hr (at intervals of 30 min), at 140° C. 30 min after the last addition, the resulting mixture was cooled to 60° C. and the 1-decene was distilled off under vacuum (2 mbar) until a bottoms temperature of 163° C. was reached.

Yield: 240 g oligomeric dispersant.

Example 5

Production of a Dispersant Oligomer, in Tetralin 75 g Tetralin was charged to a three-necked flask with magnetic stirrer, thermometer, distillation head, and $N_2$ inlet, and was heated to 140° C. under $N_2$. The following mixture was pumped into the hot solvent continuously over a period of 4 hr:

45.0 g tetralin
54.0 g monomer II-1
126.0 g monomer I-1
1.44 g initiator solution IN-1.

After completion of the feeding, 14 aliquots of 0.22 mL initiator solution IN-1 were added over 6.5 hr (at intervals of 30 min), at 140° C. 30 min after the last addition, the resulting mixture was cooled to 60° C., and the tetralin was distilled off under vacuum (1 mbar) until a bottoms temperature of 162° C. was reached.

Yield: 184 g oligomeric dispersant.

Example 6

Production of a Dispersant Oligomer, in Decalin and 1-decene 96 g Decalin and 24 g 1-decene were charged to a three-necked flask with magnetic stirrer, thermometer, distillation head, and $N_2$ inlet, and were heated to 140° C. under $N_2$. The following mixture was pumped into the hot solvent continuously over a period of 3 hr:

38.9 g monomer II-1
141.1 g monomer I-1
9.0 g oligomer from Example 1.

The feed vessel with the monomer mixture was heated to 50° C. and stirred. After completion of the feeding, 16 aliquots of 0.22 mL initiator solution IN-1 were added over 7.5 hr (at intervals of 30 min), at 140° C. 30 min after the last addition, the resulting mixture was cooled to 60° C., and the decalin and 1-decene were distilled off under vacuum (2 mbar) until a bottoms temperature of 163° C. was reached.

Yield: 206 g oligomeric dispersant.

Example 7

Production of a Dispersant Oligomer, in a Dispersant Oligomer ("d-oligomer")

60 g Oligomer from Example 2 was charged to a three-necked flask with magnetic stirrer, thermometer, distillation head, and $N_2$ inlet, and was heated to 140° C. under $N_2$. The following mixture was pumped into the hot oligomer continuously over a period of 3.5 hr:

50.4 g monomer II-1
98.4 g monomer I-2
91.2 g monomer I-1
2.4 g dodecyl mercaptan
11.52 g initiator solution IN-1.

The feed vessel with the monomer mixture was heated to 50° C. and stirred. After completion of the feeding, 3 aliquots of 0.48 mL initiator solution IN-1 were added over 1 hr (at intervals of 30 min), at 140° C. After the last addition, the mixture was maintained at 140° C. for an additional 30 min.

Yield: 200 g oligomeric dispersant.

B. Test Results

The results of tests on the products of the production Examples are summarized in the Table below.

KEY to Table:

KV-100=Kinematic viscosity test at 100° C., units of $mm_2$/sec (according to DIN 51 561).

KV-40=Kinematic viscosity test at 40° C., units of $mm^2$/sec (according to DIN 51 561).

VI-B=Viscosity index.

T/W test=Toluene/water dispersion test, described below.

The Toluene/water Dispersion Test

The additive to be tested for its emulsifying action is dissolved in toluene (to which Oracet Blue B has been added, 20 ppm) to provide a polymer concentration of 1 wt. %. 7 mL distilled water, followed by 13 mL of the 1 wt. % toluene solution, are added to a graduated 20-mL test tube with a ground glass stopper, and the mixture is held 15 min in a water bath at 30° C. A uniform emulsion is produced by vigorous shaking of the test tube, and the sample is returned to the temperature bath. The separation of the emulsion into a toluene layer, an emulsion layer, and a water layer is observed over a 24-hr period. Further, at times 5 min, 10 min, 100 min, and 24 hr, the toluene/emulsion layer boundary and emulsion/water layer boundary are read from the graduations (see FIG. 1).

Quantification

Figure 2:
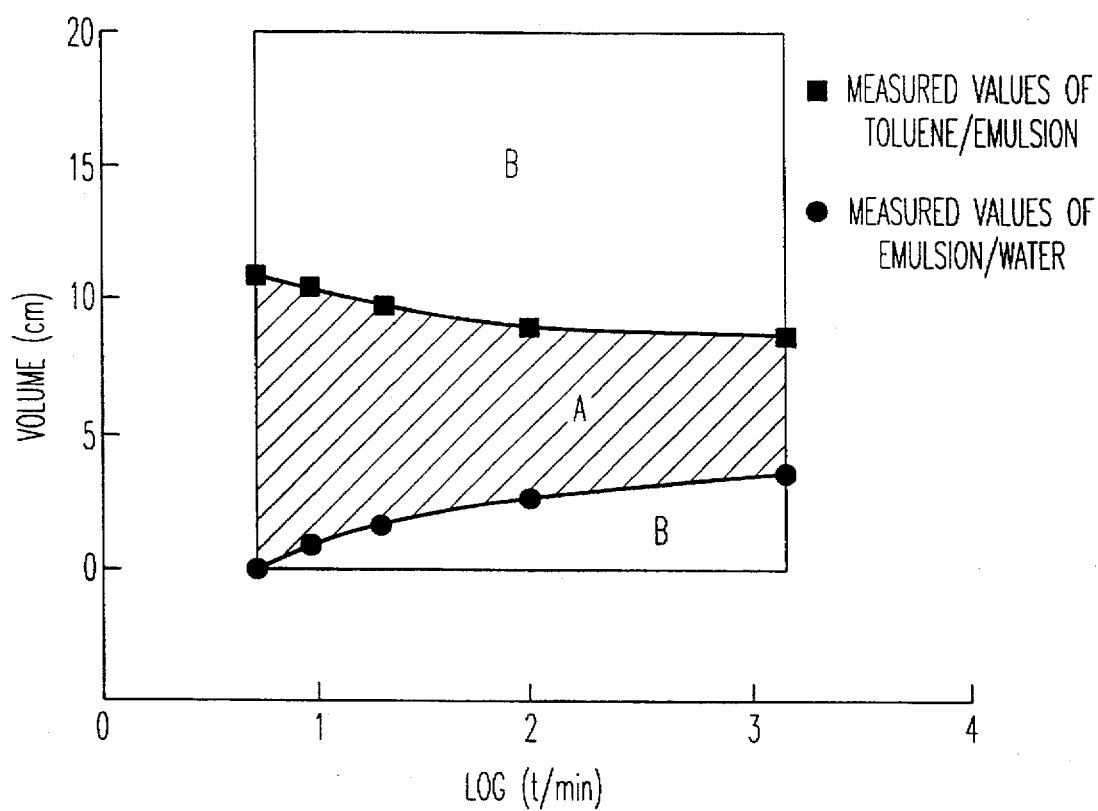
FIG. 2 shows a method for calculating a percentage value corresponding to the emulsifying action for a tested dispersant.

The emulsifying action is quantified as a percentage value, according to the scheme presented in FIG. 2. The proportional presence of emulsion in the time interval 5 min–24 hr during which the observation was carried out is characterized by the ratio of the area A to the total area (A+B), and is given as a percentage.

TABLE

| Example No. | Co-oligomers and Copolymers, from materials indicated (proportions are in wt. %) | | | KV-100 mm²s⁻¹ | KV-40 mm²s⁻¹ | VI-B | Dispersant action according to toluene/water test (units of "% emulsification") |
|---|---|---|---|---|---|---|---|
| 1 | Monomer I-1 76.4 | Monomer II-1 20.9 | 1-Decene 2.7 | 117 | 2027 | 144 | 54 |
| 2 | Monomer I-1 38.1 | Monomer I-2 41.2 | Monomer II-1 20.7 | 218 | 5440 | 145 | 75 |
| 3 | Monomer I-1 63.6 | Monomer II-1 19.7 | 1-Decene 16.8 | 180 | 3840 | 148 | 55 |
| 4 | Monomer I-2 62.3 | Monomer II-1 19.2 | 1-Decene 18.5 | 381 | 12093 | 156 | 60 |
| 5 | Monomer I-1 68.6 | Monomer II-1 29.4 | Tetralin 2.0 | 125 | 2025 | 154 | 63 |
| 6 | Monomer I-1 71.8 | Monomer II-1 19.7 | 1-Decene 8.5 | 575 | 16600 | 186 | 59 |
| 7 | Monomer I-1 37.0 | Monomer I-2 41.0 | Monomer II-1 21.0 | 384 | 8291 | 188 | 59 |

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A co-oligomer or copolymer having co-oligomer or copolymer activity, and having a weight average molecular weight of 1,000 to 30,000 Dalton comprising the following monomer units:

(A) 60–95 wt. % of at least one (meth) acrylic acid ester of formula I $$CH_2=\underset{R}{C}-\underset{\parallel}{\overset{O}{C}}-OR_1 \qquad (I)$$

$R_1$ is a straight-chain or branched alkyl group or a cycloalkyl group with 4–32 carbon atoms in the alkyl group; and (B) 5–40 wt. % of at least one (meth) acrylic acid ester of formula II $$CH_2=\underset{R'}{C}-\underset{\parallel}{\overset{O}{C}}-O-(CH_2-CH_2O)_n-(\underset{CH_3}{\overset{|}{CH}}-CH_2O)_m-R_5 \qquad (II)$$

where

R' is hydrogen or methyl, $R_2$ is an alkyl or aryl group with 1–50 carbon atoms, n is a number from 5 to 100, and m is a number form 0 to 100;

and, in the amount of 0–90 mol % of the monomers of formula II, a hydroxyalkyl ester of (meth) acrylic acid of formula III:

$$CH_2=\underset{R''}{C}-\underset{\parallel}{\overset{O}{C}}OR_3 \qquad (III)$$

where

R'' is hydrogen or methyl, and $R_3$ is an alkyl group substituted with at least one hydroxyl group and having 2–30 carbon atoms;

with the proviso that (A) and (B) together make 100 wt. %; and (C) an additional 0–75 wt. %, based on the weight of (A)+(B), of at least one 1-alkene having 4–42 carbon atoms.

2. The co-oligomer or copolymer of claim 1, wherein monomer component (B) is comprised of ethyleneoxy and propyleneoxy units in a molar ratio in the range 96:4 to 6:94.

3. The co-oligomer or copolymer of claim 2, wherein said ethyleneoxy units and the propyleneoxy units are statistically distributed.

4. The co-oligomer or copolymer of claim 1, having a weight average molecular weights in the range 3,000 to 30,000 Dalton.

5. The co-oligomer or copolymer of claim 1, comprising 1–30 wt. % of said 1-alkene.

* * * * *

UNITED STATES PATENT AND TRADEMARK OFFICE
CERTIFICATE OF CORRECTION

PATENT NO. : 5,712,359
DATED : JANUARY 27, 1998
INVENTOR(S) : CLEMENS AUSCHRA ET AL

It is certified that error appears in the above-indentified patent and that said Letters Patent is hereby corrected as shown below:

Title page, in the Abstract formula (II)

should read

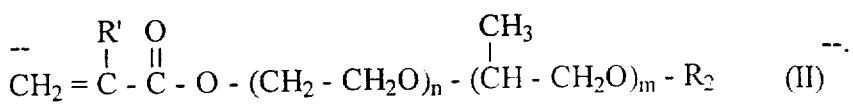

Column 2, line 43, formula (II)

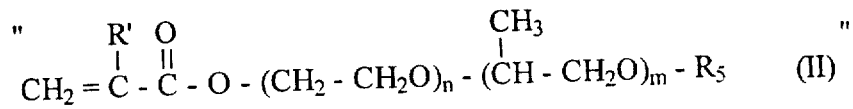

should read

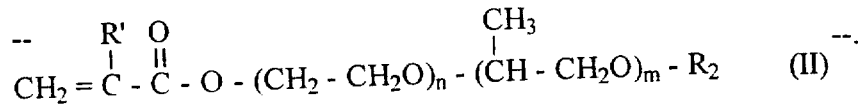

UNITED STATES PATENT AND TRADEMARK OFFICE
CERTIFICATE OF CORRECTION

PATENT NO. : 5,712,359
DATED : JANUARY 27, 1998
INVENTOR(S) : CLEMENS AUSCHRA ET AL

It is certified that error appears in the above-indentified patent and that said Letters Patent is hereby corrected as shown below:

Column 9, line 45, formula (II)

should read

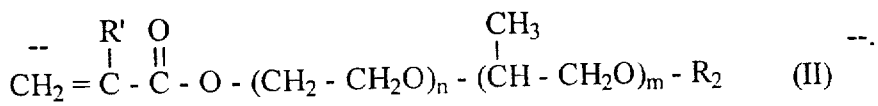

Signed and Sealed this

Twenty-eighth Day of July, 1998

*Attest:*

BRUCE LEHMAN

*Attesting Officer*  Commissioner of Patents and Trademarks